US009878800B2

(12) United States Patent
Russ et al.

(10) Patent No.: US 9,878,800 B2
(45) Date of Patent: Jan. 30, 2018

(54) RAT MOUNTING ARRANGEMENT FOR A SOFT AIRCRAFT INTERFACE

(71) Applicant: Hamilton Sundstrand Corporation, Charlotte, NC (US)

(72) Inventors: David Everett Russ, Rockford, IL (US); Kanthi Gnanam Kannan, Katy, TX (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 701 days.

(21) Appl. No.: 14/599,433

(22) Filed: Jan. 16, 2015

(65) Prior Publication Data
US 2016/0332744 A1    Nov. 17, 2016

(51) Int. Cl.
*B64D 41/00* (2006.01)
*H02K 7/18* (2006.01)

(52) U.S. Cl.
CPC ........... *B64D 41/007* (2013.01); *H02K 7/183* (2013.01); *H02K 7/1823* (2013.01); *F05B 2220/31* (2013.01); *F05B 2220/50* (2013.01); *F05D 2220/34* (2013.01); *Y02E 10/725* (2013.01)

(58) Field of Classification Search
CPC ............... B64D 41/007; F05B 2220/31; F05B 2220/50; F05D 2220/34; H02K 7/183
See application file for complete search history.

(56) References Cited

U.S. PATENT DOCUMENTS

| 2,559,451 | A | * | 7/1951 | Mcbrearty | B64C 25/14 188/289 |
| 3,614,034 | A | * | 10/1971 | Townsend | B64C 29/0058 244/12.4 |
| 4,676,458 | A | * | 6/1987 | Cohen | B64D 41/007 244/58 |
| 4,717,095 | A | * | 1/1988 | Cohen | B64D 41/007 244/58 |
| 4,742,976 | A | * | 5/1988 | Cohen | B64D 41/007 244/58 |
| 4,991,796 | A | * | 2/1991 | Peters | B64D 41/007 244/119 |
| 5,174,719 | A | * | 12/1992 | Walsh | F16N 27/005 184/6.11 |
| 5,398,780 | A | * | 3/1995 | Althof | B64D 41/007 185/39 |
| 5,484,120 | A | * | 1/1996 | Blakeley | B64D 41/007 244/54 |

(Continued)

FOREIGN PATENT DOCUMENTS

| CA | 2599979 C | * | 4/2013 | ........... B64D 41/007 |
| EP | 3095708 A1 | * | 11/2016 | ........... F15B 15/1476 |

*Primary Examiner* — Eret McNichols
(74) *Attorney, Agent, or Firm* — Kinney & Lange, P.A.

(57) ABSTRACT

A ram air turbine (RAT) mounting system includes a frame with a forward end having a first side, a second side disposed opposite the first side, a third side, and a fourth side disposed opposite the third side. The frame also includes an aft end. A first mounting element is connected to the forward end of the frame proximate the first side and the third side. A second mounting element is connected to the forward end of the frame proximate the first side and the fourth side. A first rod is connected to the forward end of the frame proximate the second side and the third side. A second rod is connected to the aft end of the frame.

12 Claims, 10 Drawing Sheets

(56) References Cited

U.S. PATENT DOCUMENTS

| | | | | |
|---|---|---|---|---|
| 5,564,903 | A * | 10/1996 | Eccles | F01D 25/164 244/58 |
| 5,957,383 | A * | 9/1999 | Benest | A01B 73/04 239/159 |
| 6,331,099 | B1 * | 12/2001 | Eccles | B64D 41/007 416/142 |
| 7,416,392 | B2 * | 8/2008 | Russ | B64D 41/007 416/142 |
| 8,622,697 | B2 * | 1/2014 | Bortoli | B64D 41/007 416/1 |
| 8,640,563 | B2 * | 2/2014 | Lang | B64D 41/007 74/89.37 |
| 8,651,815 | B2 * | 2/2014 | Russ | B64D 41/007 416/143 |
| 8,777,587 | B2 * | 7/2014 | Russ | B64D 41/007 416/143 |
| 8,931,734 | B2 * | 1/2015 | Russ | F03D 9/00 244/58 |
| 9,028,990 | B2 * | 5/2015 | Gans | B64D 41/007 429/428 |
| 9,108,742 | B2 * | 8/2015 | Russ | B64D 41/007 |
| 9,399,522 | B2 * | 7/2016 | Bannon | B64D 41/007 |
| 9,415,880 | B2 * | 8/2016 | Russ | B64D 41/007 |
| 9,511,875 | B2 * | 12/2016 | Sasscer | B64D 41/007 |
| 9,656,763 | B2 * | 5/2017 | Bannon | F15B 15/14 |
| 2009/0014582 | A1 * | 1/2009 | De Ruffray | B64C 25/18 244/102 R |
| 2012/0011953 | A1 * | 1/2012 | Bortoli | B64D 41/007 74/412 R |
| 2012/0183402 | A1 * | 7/2012 | Bortoli | B64D 41/007 416/170 R |
| 2012/0237347 | A1 * | 9/2012 | Chaudhry | F03D 9/00 416/149 |
| 2012/0328436 | A1 | 12/2012 | Soidel et al. | |
| 2016/0122034 | A1 * | 5/2016 | Bortoli | F01D 5/025 416/142 |
| 2017/0158344 | A1 * | 6/2017 | Janisiow | F16H 25/18 |

* cited by examiner

RAT MOUNTING ARRANGEMENT FOR A SOFT AIRCRAFT INTERFACE

BACKGROUND

The present disclosure relates generally to ram air turbines for aerospace applications. More particularly, this disclosure relates to an improved mounting system for a ram air turbine.

Aircrafts include, as standard equipment, a back-up power source for use in times of power outage in the main power system. This standard equipment generally includes a ram air turbine (RAT). The RAT is stowed in a storage bay within the fuselage or wing of an aircraft. Should the main power system of the aircraft go offline, the RAT can be deployed into the airstream surrounding the aircraft where the passing air relative to the speed of the aircraft causes the turbine blades of the RAT to rotate. The RAT may generate hydraulic power, electric power, or both. The RAT is coupled to suitable power generating equipment, such as a hydraulic pump for hydraulic power, or an electric generator for electric power, or both in the case of a hybrid RAT.

Both in the stowed position and especially in the deployed operating position of the RAT, the RAT can exhibit multiple resonance modes. These resonant modes can be damaging to the RAT and the support structure connecting the RAT to the aircraft if the resonant modes occur within 15% of the dynamic loading frequencies, such as in the case of turbine rotation frequency (commonly referred to as the operating range) of the RAT in the deployed position. For example, every RAT includes a torsion mode which can cause a turbine nose of the RAT to move from side to side and cause the support structure of the RAT to deform torsionally. A heel-toe mode is a resonance mode that can cause the turbine nose to move up and down and cause both the driveshaft of the turbine of the RAT and the support structure of the RAT to bend. In the stowed position, the RAT could be subjected to dynamic loading during a main engine fan-blade-out event. In this case, it is desirable for the RAT resonant modes to stay above engine wind milling upper limit by 15%.

The theory is known that substantially increasing the stiffness of the support structure of the RAT can move the harmonic frequency range at which these resonance modes of the RAT occur away from the frequencies of the operating range of the RAT. However, manufacturing a high stiffness aircraft mounting structure has been traditionally difficult to achieve, being both weight and cost prohibitive, and a RAT without a frame is more difficult to install in the aircraft.

SUMMARY

In one aspect of the invention, a ram air turbine (RAT) mounting system includes a frame having a forward end with a top side, a bottom side disposed opposite the top side, an inboard side, and an outboard side disposed opposite the inboard side. The frame further includes an aft end. A first lug is connected to the forward end of the frame proximate the top side and the inboard side. A second lug is connected to the forward end of the frame proximate the top side and the outboard side. A first rod is connected to the forward end of the frame proximate the bottom side and the inboard side. A second rod is connected to the aft end of the frame.

In another aspect of the invention, a ram air turbine (RAT) mounting system includes a frame with a forward end having a first side, a second side disposed opposite the first side, a third side, and a fourth side disposed opposite the third side. The frame also includes an aft end. A first mounting element is connected to the forward end of the frame proximate the first side and the third side. A second mounting element is connected to the forward end of the frame proximate the first side and the fourth side. A first rod is connected to the forward end of the frame proximate the second side and the third side. A second rod is connected to the aft end of the frame.

Persons of ordinary skill in the art will recognize that other aspects and embodiments of the present invention are possible in view of the entirety of the present disclosure, including the accompanying figures.

Figure 1A:
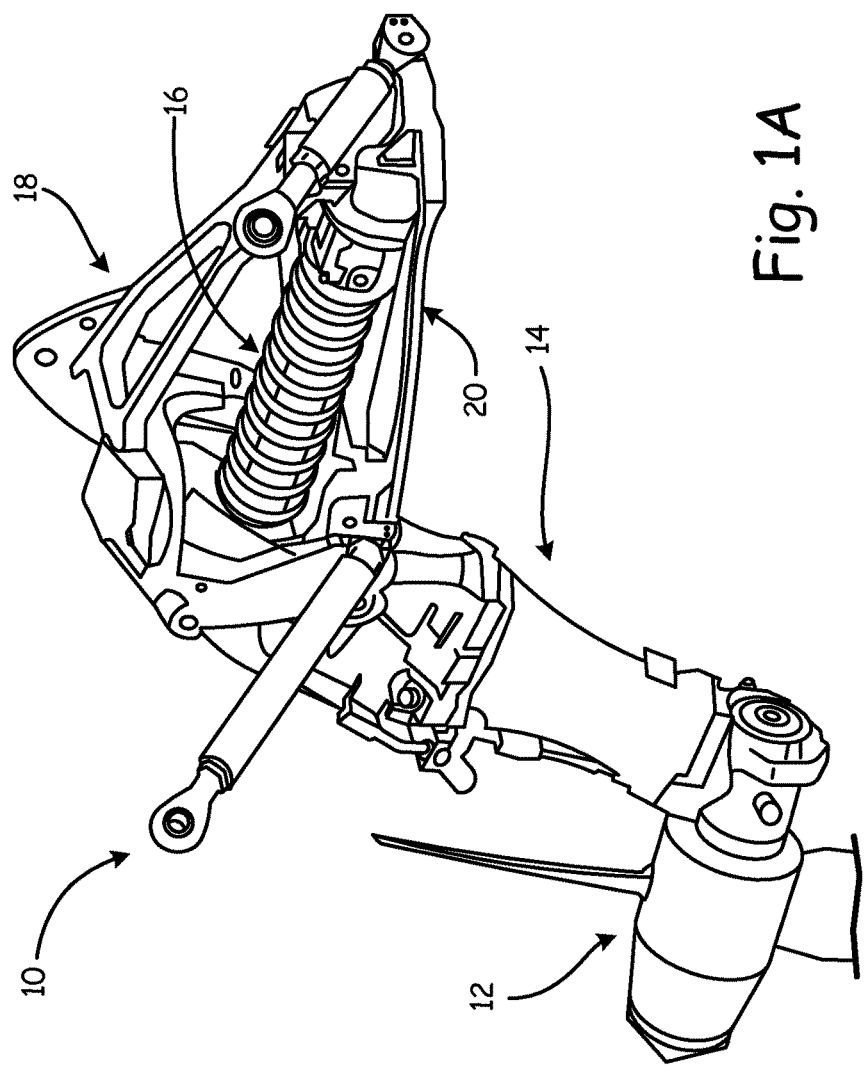
FIG. 1A is a perspective view of a ram air turbine in a deployed position.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a mounting system for a ram air turbine (RAT) that moves the harmonic frequency range at which resonance modes occur in the RAT away from the frequencies of the operating range of the RAT in the deployed position such that the harmonic frequency range of the resonance modes does not overlap the frequency of the operating range of the RAT. In the stowed position, the RAT resonant mode frequencies are well above the engine windmilling upper limit. The mounting system includes a frame with a front support block, a rear support block, a top plate extending between the front support block and the rear support block, and a bottom plate also extending between the front support block and the rear support block. The frame can further include a diagonal brace at the outboard side of the frame that braces the aft end of top plate with the fore end of the bottom plate and the front support block. The frame is attached to an aircraft fuselage or wing by two lugs and two rods. Both lugs are disposed proximate a top side of the front support block and resist movement of the RAT in two directions. The first rod is connected to a bottom side of the front support block at an inboard side, and the second rod is connected to the rear support block. When mounted on an aircraft, both rods are angled generally inboard towards an axial center of the aircraft and resist movement of the RAT in the inboard direction. The mounting system helps move the harmonic frequency range at which these resonance modes of the RAT occur away from the frequencies of the operating range of the RAT in the deployed position and also helps to move the resonant frequencies of the RAT in the stowed position away from the dynamic loading frequencies in the stowed position. The mounting system is relatively low in weight and cost and facilitates the RAT installation in the aircraft.

Figure 1B:
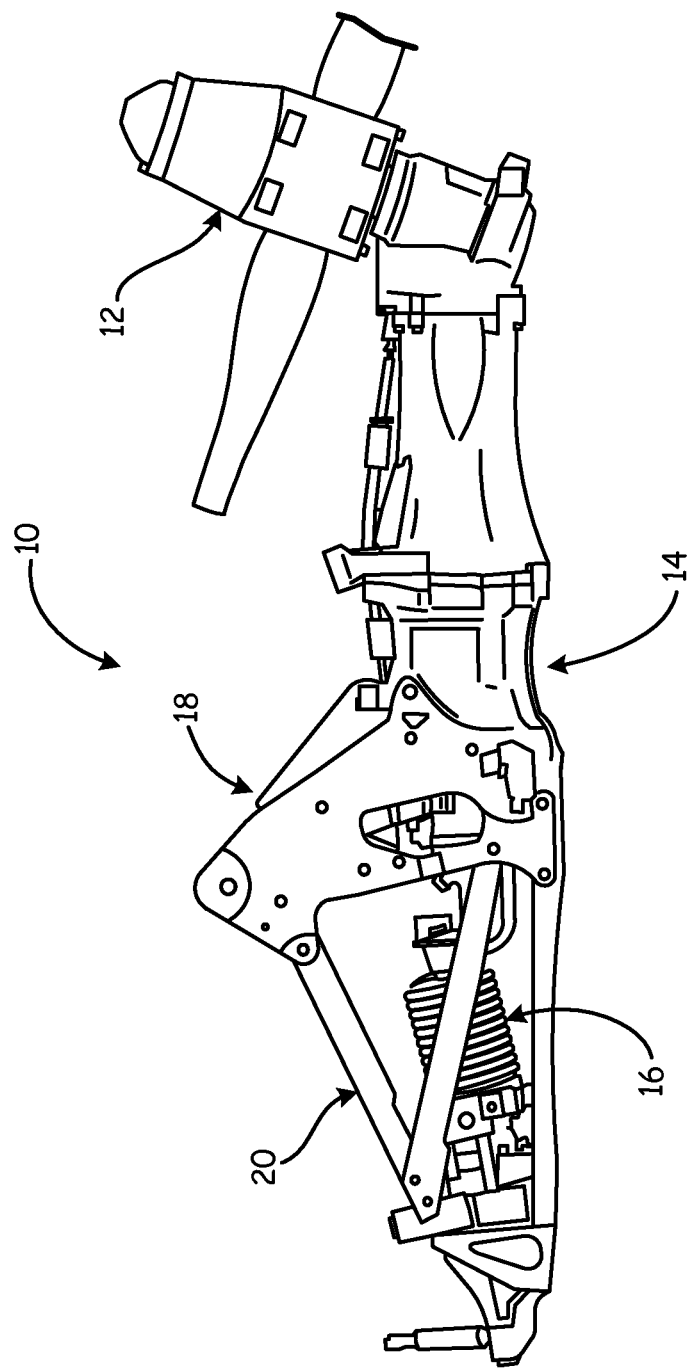
FIG. 1B is a perspective view of the ram air turbine of FIG. 1A in a stowed position.

FIGS. 1A-1B FIG. will be discussed concurrently. FIG. 1A is a perspective view of RAT assembly 10 in a deployed position. FIG. 1B is a perspective view of RAT assembly 10 of FIG. 1A in a stowed position. As shown in FIGS. 1A-1B, RAT assembly 10 can comprise turbine 12, generator housing 14, deployment actuator 16, and RAT mounting system 18. During operation, RAT mounting system 18 connects the RAT assembly 10 to an aircraft (not shown). Generator housing 14 is pivotally connected to RAT mounting system 18 such that deployment actuator 16 can push turbine 12 away from an aircraft body and into an airstream surrounding the aircraft in the unlikely event that a main power system of the aircraft goes offline. Deployment actuator 16 controls the deployment speed of the turbine 12 into the airstream and locks the RAT assembly 10 in the deployed position. As discussed below in FIG. 2, RAT mounting system 18 includes frame 20 disposed around deployment actuator 16.

Figure 2:
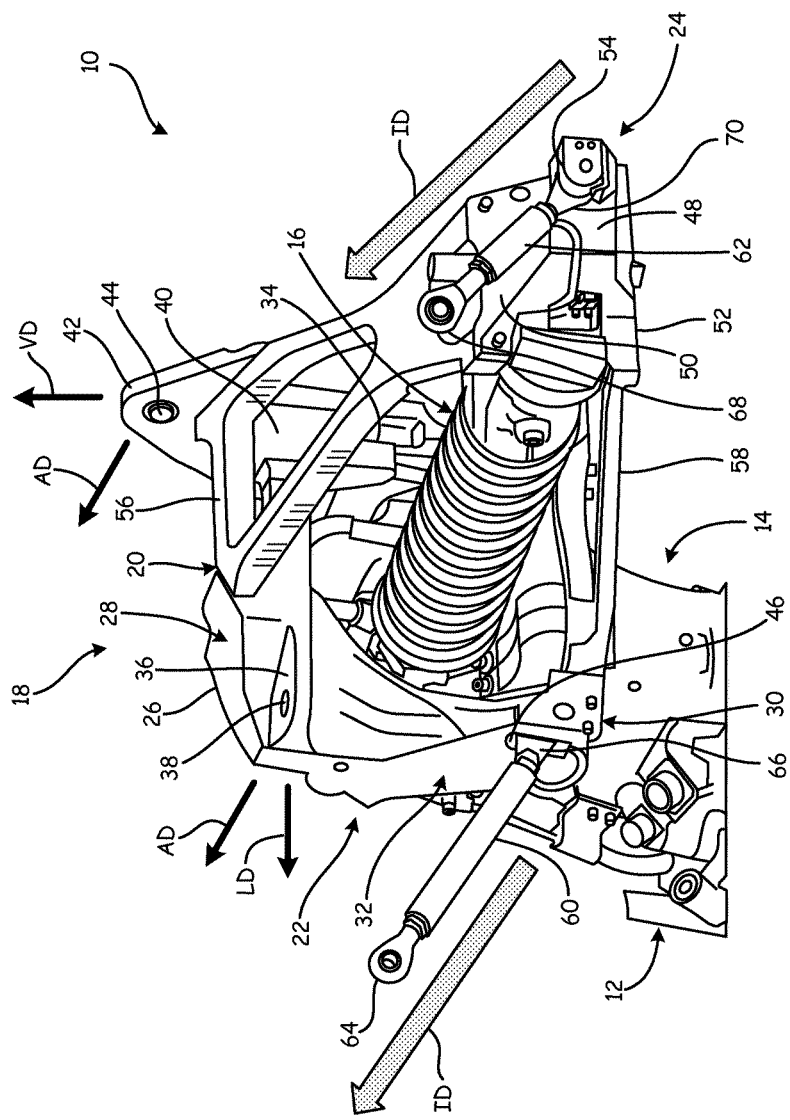
FIG. 2 is a perspective view of a mounting system of the ram air turbine of FIGS. 1A-1B.

FIG. 2 is a perspective view of RAT mounting system 18 with frame 20 of RAT assembly 10 of FIGS. 1A-1B. As shown in FIG. 2, frame 20 can include forward end 22 and aft end 24. Frame 20 can further include front support block 26 disposed at forward end 22. Front support block 26 can include top side 28, bottom side 30, inboard side 32, outboard side 34, and first mounting element 36 with first hole 38. Outboard side plate 40 can include second mounting element 42 and second hole 44 formed in second mounting element 42. Front support block 26 can also include first slot 46. Frame 20 can further include rear support block 48 disposed at aft end 24 of frame 20. Rear support block 48 can include top side 50, bottom side 52, and second slot 54. Furthermore, frame 20 can include top plate 56 and bottom plate 58. In addition to frame 20, RAT mounting system 18 can also include first rod 60 and second rod 62. First rod 60 can include aircraft connection end 64 and frame connection end 66. Second rod 62 can include aircraft connection end 68 and frame connection end 70.

Forward end 22 and aft end 24 of frame 20 are spaced opposite one another in an axial direction AD. Front support block 26 is disposed at forward end 22 of frame 20 and rear support block 48 is disposed at aft end 24 of frame 20 such that front support block 26 is axially spaced from rear support block 48. Top plate 56 and bottom plate 58 can both extend between front support block 26 and rear support block 48. Top plate 56 is disposed above bottom plate 58 in a vertical direction VD such that bottom plate 58 is disposed generally opposite top plate 56. The vertical direction VD is generally perpendicular with the axial direction. For sake of reference, a lateral direction LD is generally perpendicular with the vertical direction VD and the axial direction AD. Both the axial direction AD and the lateral direction LD may lie on a horizontal plane. Inboard side 32 and outboard side 34 of front support block 26 may be connected approximately perpendicular to top side 28 of front support block 26 such that inboard side 32 is disposed opposite outboard side 34. When frame 20 is mounted to an aircraft (not shown), inboard side 32 generally faces in toward the aircraft. Inboard side 32 can face the aircraft in the axial direction AD, can face the aircraft in an inboard direction ID, or combinations thereof. The inboard direction ID is defined as a direction that faces inside or toward the longitudinal axis or center of a hull of the aircraft. Outboard side 34 will generally face away from the hull of the aircraft.

First mounting element 36 can be connected to support block 26 of frame 20 proximate top side 28 and inboard side 32 of front support block 26. First mounting element 36 can be a flat lug 36 formed from top side 28 and inboard side 32 that extends generally in the lateral direction LD. The first mounting element 36, or first lug 36, can include first hole 38 extending generally in the vertical direction VD through first lug 36. Outboard side plate 40 can be connected to outboard side 34 of front support block 26. Outboard side plate 40 can extend in the vertical direction VD beyond top side 28 of front support block 26. Second mounting element 42 can be connected to support block 26 proximate top side 28 and outboard side 34. Second mounting element 42 can be formed from the portion of outboard side plate 40 that extends in the vertical direction VD beyond top side 28 of front support block 26. Second mounting element 42 can also be a flat lug, referred to as second lug 42. Second lug 42 can extend generally in the vertical direction VD and can comprise second hole 44 extending generally in the lateral direction LD through second lug 42.

First slot 46 can be formed in inboard side 32 of front support block 26 proximate bottom side 30 of front support block 26. First slot 46 can be configured to receive frame connection end 66 of first rod 60 such that first rod 60 can be connected to support block 26 proximate bottom side 30 and inboard side 32. First rod 60 can be a tie-rod. As shown in FIG. 2, first rod 60 can extend from inboard side 32 generally in the inboard direction ID for connection with the aircraft (not shown). Because the inboard direction ID is dependent on the position of frame 20 relative the hull of the aircraft, first rod 60 can be configured to extend from inboard side 32 of front support block 26 at approximately 30 degrees to approximately 45 degrees from the horizontal plane.

Second slot 54 can be formed in rear support block 48 and can be configured to receive frame connection end 70 of second rod 62. Second rod 62 can extend from rear support block 48 and aft end 24 of frame 20 generally in the inboard direction ID and generally parallel with first rod 60. In additional embodiments, second rod 62 can extend from rear support block 48 at approximately 20 degrees to approximately 80 degrees from the horizontal plane. Second rod 62 can also be adjustable in length so that second rod 62 can function as an adjustment feature to modify a position of frame 20 and RAT assembly 10 relative to the aircraft in case there is very little room between a fuselage of the aircraft and turbine 12 when RAT assembly 10 is in the stowed position. A process of installing RAT mounting system 18 to an aircraft is described below with reference to FIGS. 3A-3B.

Figure 3A:
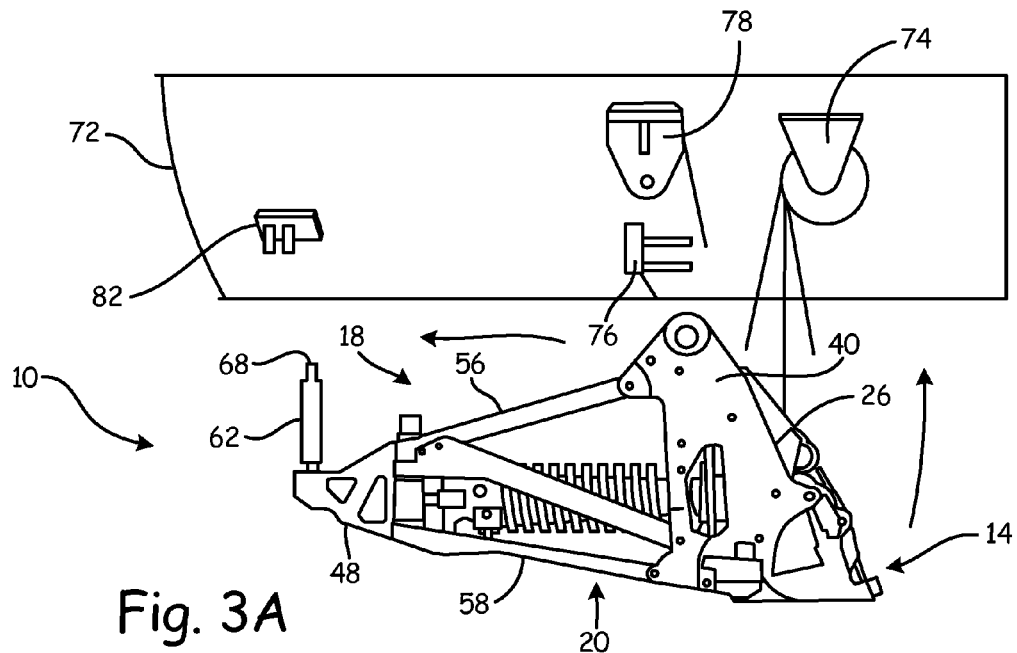
FIG. 3A is a side elevation view of the mounting system of FIG. 2 showing the ram air turbine being lifted into an aircraft by a pulley and cable system.
Figure 3B:
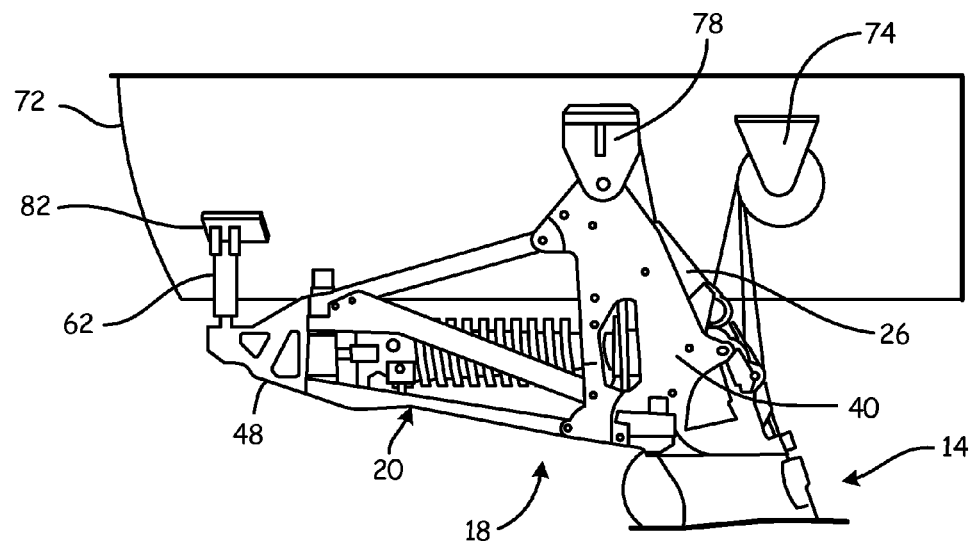
FIG. 3B is side elevation view of the mounting system of FIG. 2 connected to an aircraft.
Figure 3C:
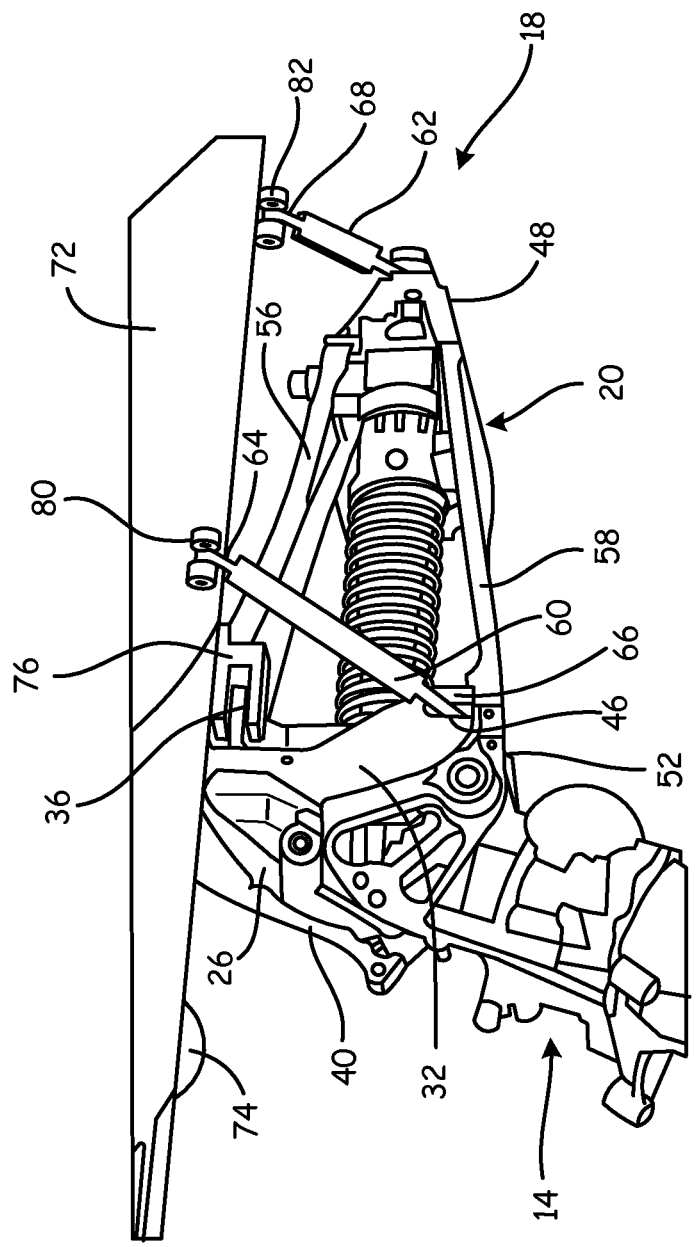
FIG. 3C is a rotated perspective view of the mounting system and aircraft disclosed in FIGS. 3A-3B.

FIG. 3A is a side elevation view of RAT mounting system 18 of FIG. 2 positioned to be connected to aircraft 72. FIG. 3B is side elevation view of RAT mounting system 18 of FIG. 2 connected to aircraft 72. FIG. 3C is a rotated perspective view of RAT mounting system 18 and aircraft 72 disclosed in FIGS. 3A-3B. As shown in FIGS. 3A-3C, aircraft 72 can include first aircraft bracket 76, second aircraft bracket 78, third aircraft bracket 80, and fourth aircraft bracket 82. FIGS. 3A-3C also show pulley system 74 which can be used to help lift and maneuver RAT assembly 10 as RAT mounting system 18 is connected to aircraft 72. To connect RAT mounting system 18 to aircraft 72, RAT assembly 10 is first lifted in the vertical direction VD towards aircraft 72 such that first lug 36 and second lug 42 are position just forward of first aircraft bracket 76 and second aircraft bracket 78. RAT assembly 10 is then moved aftward such that first aircraft bracket 76 receives first lug 36 and second aircraft bracket 78 receives second lug 42. Once first lug 36 and second lug 42 are secured to first aircraft bracket 76 and second aircraft bracket 78 respectively, aircraft connection 64 of first rod 60 can be secured to third aircraft bracket 80 and second rod 60 can be secured to fourth aircraft bracket 82. Because first lug 36 extends in the lateral direction LD and second lug 42 extends in the vertical direction VD, RAT assembly 10 does not need to be twisted or rotated at the same time it is lifted to aircraft 72 thereby reducing strain on operators handling RAT assembly 10.

During operation of aircraft 72 and RAT assembly 10 (as shown in FIG. 2), first lug 36 aides RAT assembly 10 by resisting vibrations of RAT assembly 10 in the lateral direction LD and the axial direction AD, thereby increasing the natural resonant frequencies of the RAT assembly 10 in the lateral direction and the axial direction AD well above the frequencies of the operating range of RA. The aircraft mount interface with dynamic stiffness values below 200,000 lbf/in (35,025,367 N/m) at any of the connections between an aircraft and a RAT is considered as a soft aircraft mount interface. First aircraft bracket 76 can have a dynamic mount stiffness of approximately 300,000 lbf/in (52,538,050 N/m) or greater in the lateral direction LD, and a dynamic mount stiffness of approximately 300,000 lbf/in (52,538,050 N/m) or greater in the axial direction AD. Second aircraft bracket 78 aides RAT assembly 10 by resisting vibrations of RAT assembly 10 in the axial direction AD and the vertical direction VD, thereby increasing the natural resonant frequencies necessary to vibrate RAT assembly 10 in both the axial direction AD and the vertical direction VD well above the frequencies of the operating range of RAT assembly 10. Second aircraft bracket 78 can have a dynamic mount stiffness of approximately 200,000 lbf/in (35,025,367 N/m) or less in the vertical direction VD, and a dynamic mount stiffness of approximately 300,000 lbf/in (52,538,050 N/m) or greater in the axial direction AD. It is understood that the dynamic mount stiffness values described above with respect to first aircraft bracket 76 and second aircraft bracket 78 represent the combined aircraft stiffnesses experienced by RAT assembly 10 at first lug 36 and second lug 42 respectively.

Both first rod 60 and second rod 62 aid RAT assembly 10 by resisting vibrations of RAT assembly 10 in the inboard direction AD (such as vibrations caused by the rotation of turbine 12 of RAT assembly 10), thereby increasing the natural resonant frequencies necessary to vibrate RAT assembly 10 in the inboard direction ID well above the frequencies of the operating range of RAT assembly 10. As seen in FIG. 3C, both third aircraft bracket 80 and fourth aircraft bracket 82 can have a dynamic mount stiffness of approximately 200,000 lbf/in (35,025,367 N/m) or less. Second rod 62 can also aid RAT assembly 10 by resisting vibrations in the vertical direction. The angular orientation of second rod 62 can be 50 degrees from the vertical direction VD (+/−30 degrees) so as to increase the natural resonant frequency as high as the aircraft mount system allows. It is understood that the dynamic mount stiffness values described above with respect to third aircraft bracket 80 and fourth aircraft bracket 82 represent the combined aircraft stiffnesses experienced by RAT assembly 10 at first rod 60 and second rod 62 respectively.

Figure 4:
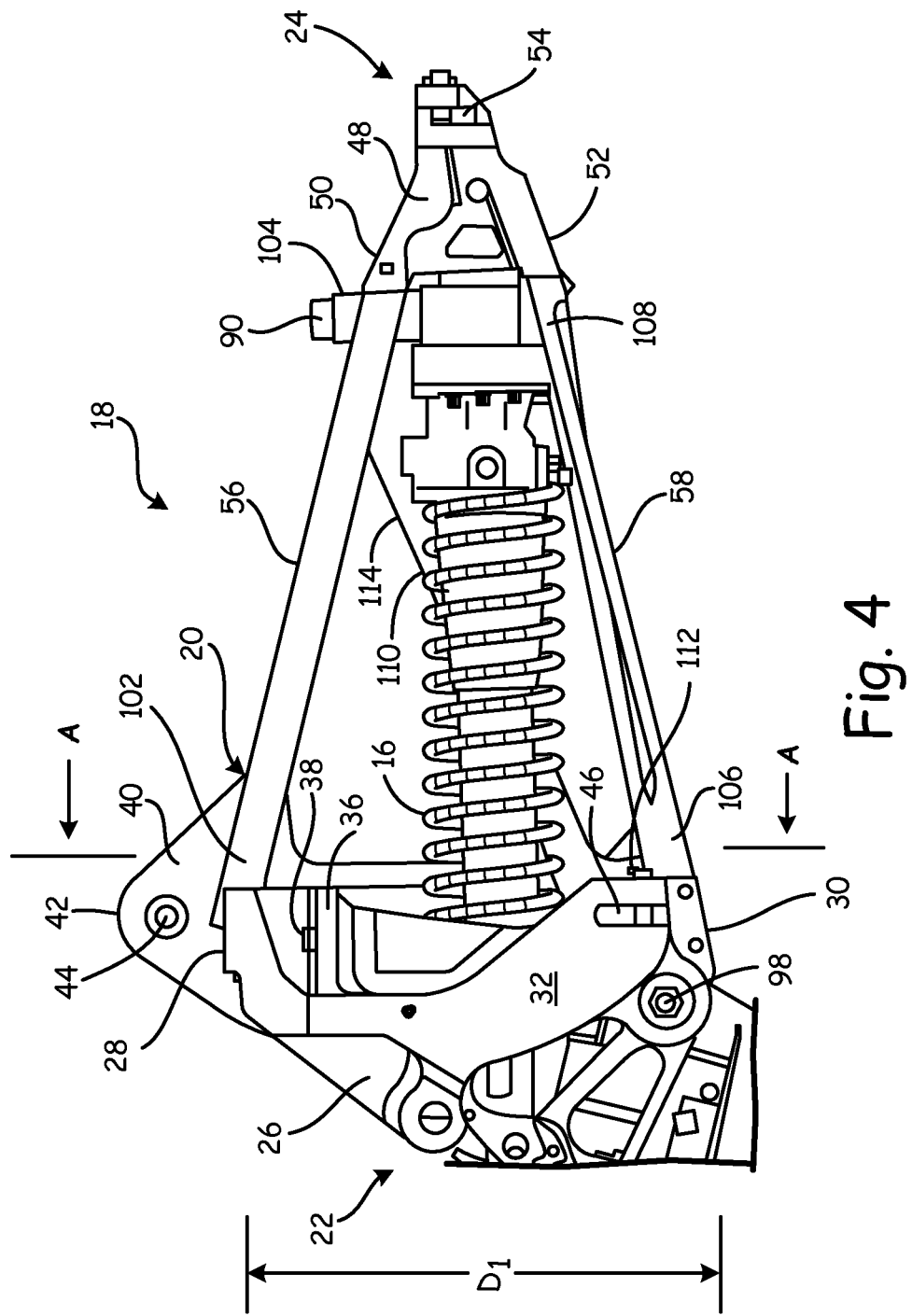
FIG. 4 is a side elevation view of an inboard side of a frame of the mounting system disclosed in FIGS. 2-3C.
Figure 5:
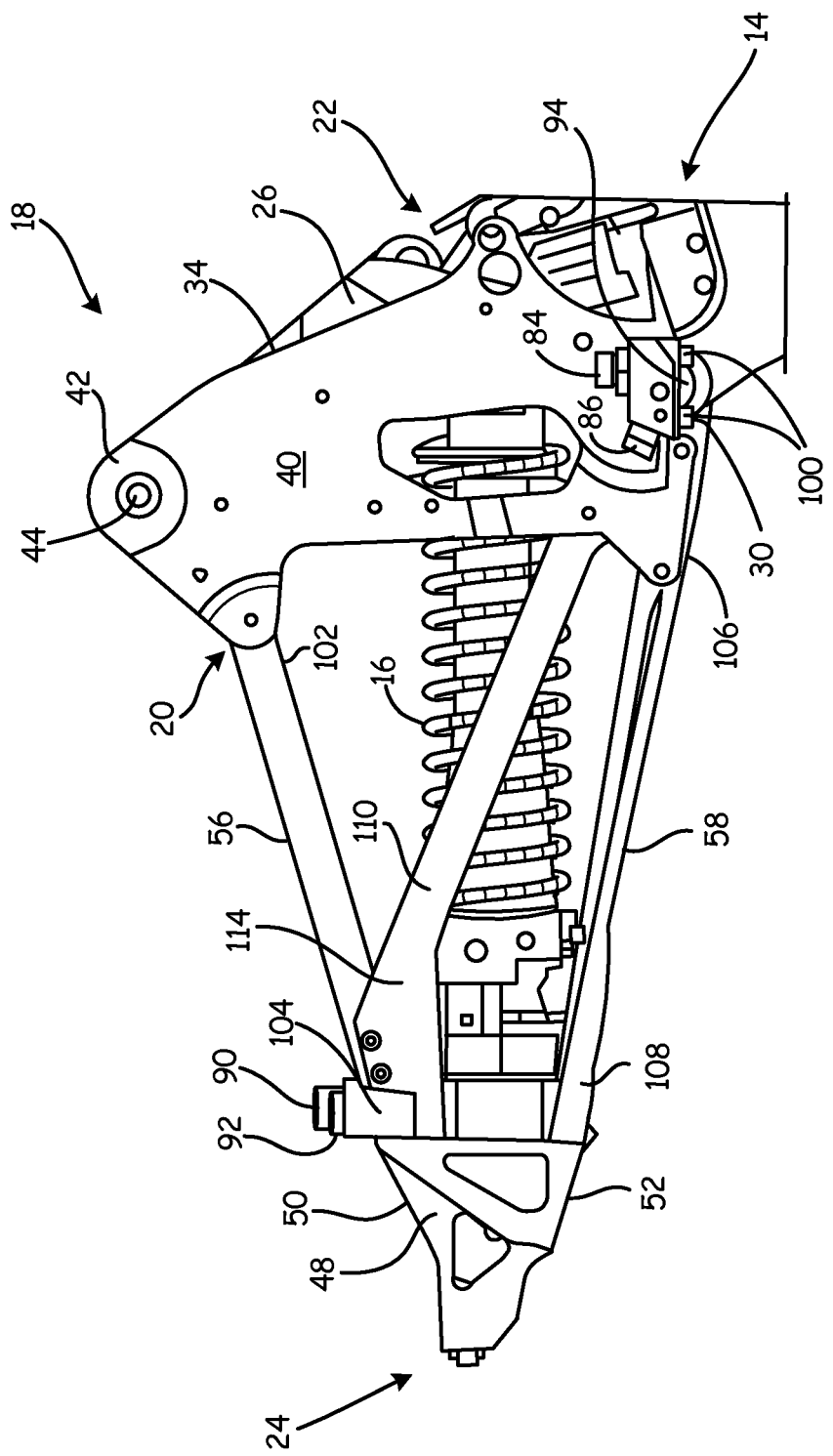
FIG. 5 is a side elevation view of an outboard side of the frame disclosed in FIG. 4.
Figures 6, 7:
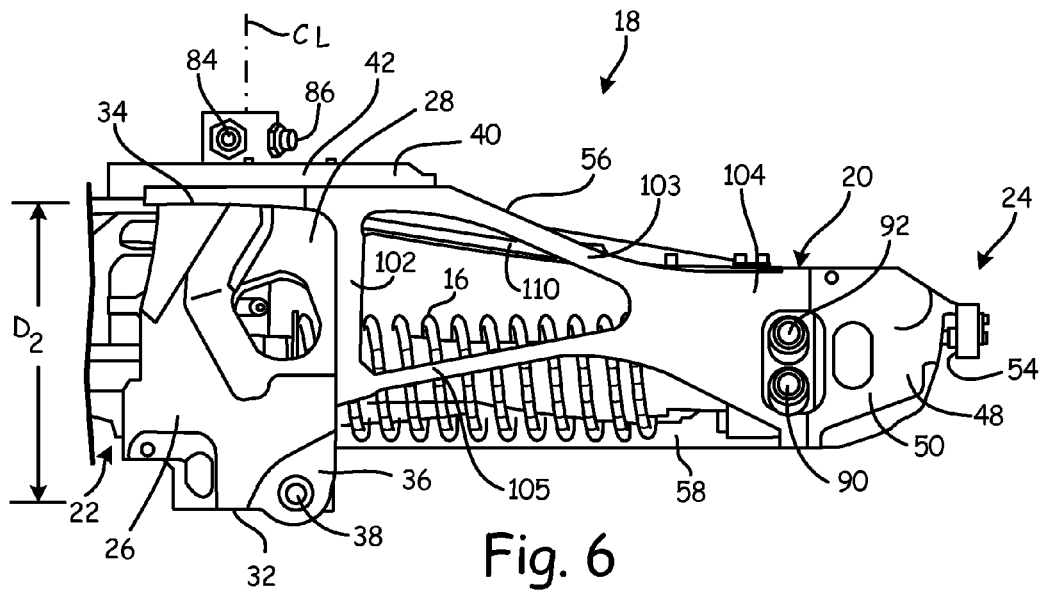
FIG. 6 is a top elevation view of the frame disclosed in FIGS. 4-5.
FIG. 7 is a bottom elevation view of the frame disclosed in FIGS. 4-6.

FIGS. 4-7 will be discussed concurrently. FIG. 4 is a side elevation view of frame 20, the side elevation view facing inboard side 32 of front support block 26. FIG. 5 is a side elevation view of frame 20, the side elevation view facing outboard side plate 40 of front support block 26. FIG. 6 is a top elevation view of frame 20 and FIG. 7 is a bottom elevation view of frame 20. As shown in FIGS. 4-7, stationary pivot post 94 can include hydraulic fluid inlet 84 and outlet 86. Generator housing 14 contains pivot sleeve 88, which is journaled on pivot post 94. Deployment actuator 16 can include deploy solenoids 90 and 92. Front support block 26 can further include pivot post 94 with central axis CL, inboard bolt 98, and outboard clamping bolts 100. Top plate 56 can include forward end 102, outboard beam 103, aft end 104, and inboard beam 105. Bottom plate 58 can include forward end 106, inboard beam 107, aft end 108, and outboard beam 109. Frame 20 can also include brace 110. Brace 110 includes forward end 112 and aft end 114.

Forward end 102 of top plate 56 can be connected to front support block 26 proximate top side 28 of front support block 26. Forward end 102 of top plate 56 can also be connected to outboard side plate 40 so as to increase a stiffness of frame 20 at forward end 102 of top plate 28 and create a direct load path between top plate 56 and outboard side plate 40. Aft end 104 of top plate 56 can be connected to rear support block 48 proximate top side 50 of rear support block 48. Outboard beam 103 and inboard beam 105 of top plate 56 extend between forward end 102 and aft end 104. Inboard beam 105 is disposed generally inboard from outboard beam 103. Outboard beam 103 and inboard beam 105 are spaced from one another at forward end 102 of top plate 56, but taper towards one another as both outboard beam 103 and inboard beam 105 extend towards aft end 104. Outboard beam 103 and inboard beam 105 lighten the overall weight of top plate 56 by reducing the amount of material used in top plate 56. A width of inboard beam 105 of top plate 56 in the lateral direction LD (shown in FIG. 2) is approximately 50% of a thickness of inboard beam 105 in the vertical direction VD (also shown in FIG. 2). Adjusting the width of inboard beam 105 of top plate 56 to be approximately 50% of the thickness of inboard beam 105 reduces the frame mode frequency away from the operating range frequency of RAT assembly 10 without significantly impacting the torsion mode frequency and the heel-toe mode frequency of RAT assembly 10.

Forward end 106 of bottom plate 58 can be connected to front support block 26 proximate bottom side 30 of front support block 26. Forward end 106 of bottom plate 58 can also be connected to outboard side plate 40 to form a load path between outboard side plate 40 and bottom plate 58. Aft end 108 of bottom plate 58 can be connected to rear support block 48 proximate bottom side 52 of rear support block 48. Inboard beam 107 and outboard beam 109 of bottom plate 58 can extend between forward end 106 and aft end 108 of bottom plate 58. Inboard beam 107 can be disposed inboard from outboard beam 109 and can be spaced from outboard beam 109 in the lateral direction LD (shown in FIG. 2). Inboard beam 107 and outboard beam 109 can lighten the overall weight of bottom plate 58 by reducing the amount of material used in bottom plate 58. A width of inboard beam 107 of bottom plate 58 in the lateral direction LD (shown in FIG. 2) is approximately twice the thickness of inboard beam 107 in the vertical direction VD (also shown in FIG. 2). Adjusting the width of inboard beam 107 of bottom plate 58 to be approximately double the thickness of inboard beam 107 also reduces the frame mode frequency away from the operating range frequency of RAT assembly 10 without significantly impacting the torsion mode frequency and the heel-toe mode frequency of RAT assembly 10.

Brace 110 can extend from front support block 26 to the aft end of plate 56. Forward end 112 of brace 110 can be connected to forward end 106 of bottom plate 58 and also to outboard side plate 40. Aft end 114 of brace 110 can be connected to aft end 104 of top plate 56. Because brace 110 extends in a diagonal manner from forward end 106 of bottom plate 58 to aft end 104 of top plate 56, brace 110 aides in stiffening frame 20 against twisting torsion modes.

Pivot post 94 can extend along bottom side 30 of front support block 26 between inboard side 32 of front support block 26 and outboard side plate 40. Central axis CL of pivot post 94 can be generally parallel with the lateral direction LD. Pivot sleeve 88 of generator housing 14 is disposed around pivot post 94 and can rotate relative pivot post 94 to allow generator housing 14 and turbine 12 to translate between the stowed position and deployed position shown in FIGS. 1A-1B. Pivot post 94 can be rigidly and non-rotatably connected to front support block 26 at inboard side 32 and rigidly and non-rotatably connected to outboard side plate 40 to increase the frame natural frequencies. First slot 46 can be formed in inboard side 32 of front support block 26 proximate bottom side 30 of front support block 26 and proximate pivot post 94 so that first rod 60 can be connected to frame 20 proximate pivot post 94. By rigidly connecting pivot post 94 to inboard side 32 and outboard side plate 40, and by position first rod 60 proximate pivot post 94, pivot post 94 can function as an integral member of frame 20 to stiffen frame 20 by transferring loads across bottom side 30 of front support block 26. Inboard bolt 98 can connect pivot post 94 to inboard side 32 of front support block 26. Outboard clamping bolts 100 can connect pivot post 94 to outboard side plate 40 and can rotationally lock pivot post 94 such that pivot post 94 cannot rotate relative the other members of frame 20. Inlet 84 and outlet 86 can be assembled on an end of pivot post 94 and passages plumbed through pivot post 94 and pivot sleeve 88 to circulate hydraulic fluid between a hydraulic pump disposed inside generator housing 14 and inlet 84 and outlet 86. To increase the stiffness of the frame to rotation about the axial direction AD, the lateral rod 60 is positioned at the most effective position close to pivot post 94.

Vertical distance D1 is the distance between top side 28 of front support block 26 and bottom side 30 of front support block 26, and horizontal distance D2 is the distance between inboard side 32 of front support block 26 and outboard side 34 of front support block 26. The horizontal distance D2 is wide enough to allow frame 20 to surround generator housing 14 at forward end 22 of frame 20, and vertical distance D1 is larger than horizontal distance D2 to allow generator housing 14 to rotate about pivot post 94. Front support block 26 can also be substantially larger than rear support block 48 since front support block 26 since high stiffness in front support block 26 is more effective in raising the torsional natural frequency than stiffness in rear support block 48. In the embodiments of FIGS. 1A-10, front support block 26 can comprise approximately 45% of a total weight of frame 20.

Figure 8:
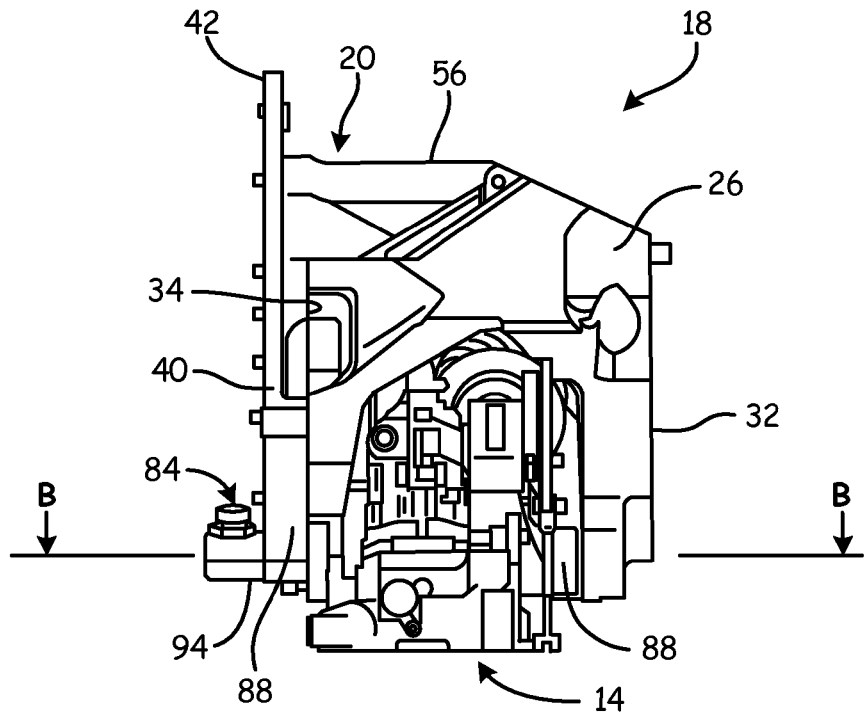
FIG. 8 is a front elevation view of the frame disclosed in FIGS. 4-7.
Figure 9:
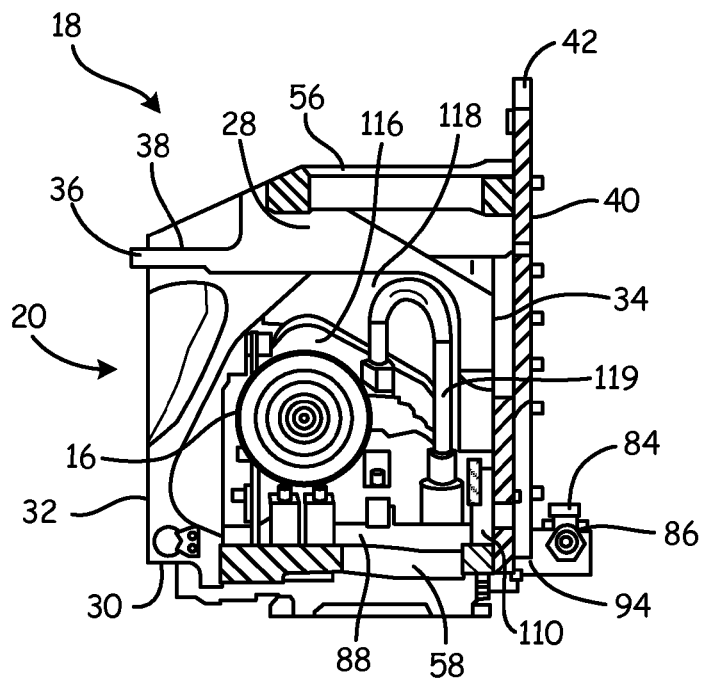
FIG. 9 is a cross-sectional view of the frame disclosed in FIGS. 4-8 taken along line A-A in FIG. 4.

FIGS. 8 and 9 will be discussed concurrently. FIG. 8 is a front elevation view of frame 20 discussed in FIGS. 4-7. FIG. 9 is a cross-sectional view of frame 20 disclosed in FIGS. 4-8 taken along line A-A in FIG. 4. As shown in FIGS. 8 and 9, front support block 26 can further include cavity 116 and flange 118.

Cavity 116 can extend completely through a center of front support block 26 in the axial direction AD. Cavity 116 can be positioned vertically between pivot post 94 and top side 28 of front support block 26. Cavity 116 permits deployment mechanism 16 to extend axial through front support block 26 to translate generator housing 14. Cavity 116 also provides space to accommodate hydraulic tube 119 that aide in the transfer of hydraulic fluid between the hydraulic pump disposed inside generator housing 14 and pivot post 94. Flange 118 can be disposed inside cavity 116 and can extend from top side 28 of front support block 26 to outboard side 34 of front support block 26. Flange 118 can provide additional structure support to front support block 26 proximate cavity 116 to improve the resonant frequencies. Flange 118 uses most of the available room between generator housing 14 in the stowed position and tube 119 in the deployed position to stiffen the frame as much as possible.

Figure 10:
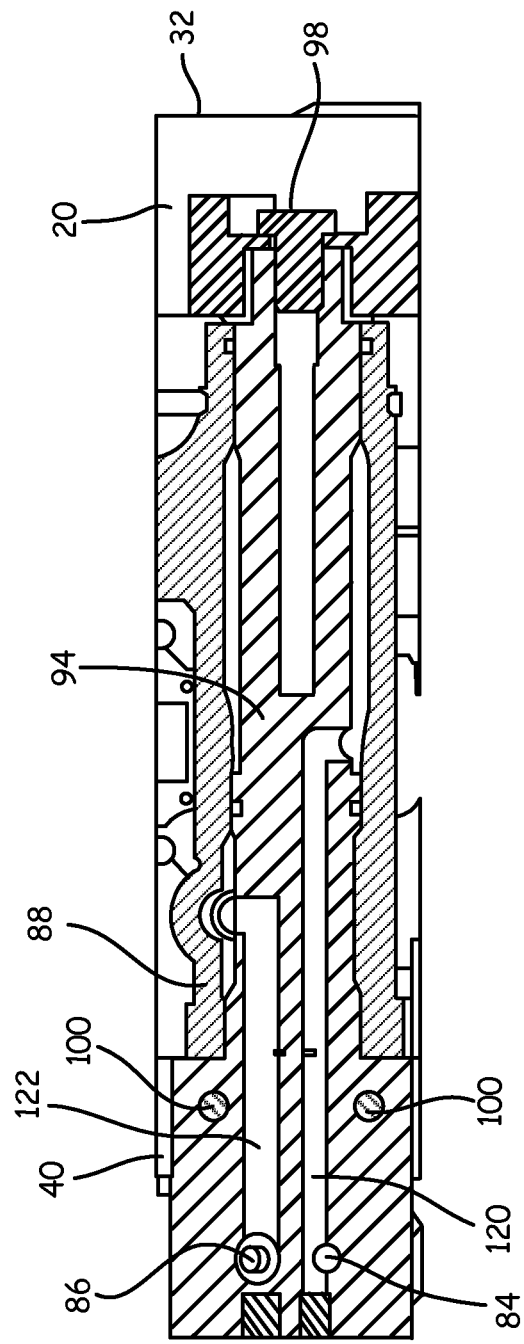
FIG. 10 is a cross-sectional view of a pivot post of the frame disclosed in FIGS. 4-9 taken along line B-B in FIG. 8.

FIG. 10 is a cross-sectional view of pivot post 94 taken along line B-B in FIG. 8. As shown in FIG. 10, pivot post 94 can include inlet passage 122 and outlet passage 120. Inlet passage 120 is formed in pivot post 94 and communicates hydraulic fluid from inlet 84 to a space between pivot post 94 and pivot sleeve 88. After passing through tube 119 into the hydraulic pump disposed inside generator housing 14, the hydraulic fluid returns to pivot post 94, flows through outlet passage 122 inside pivot post 94, and exits pivot post 94 through outlet 86. By directing the hydraulic fluid through pivot post 94, the hydraulic fluid lubricates pivot post 94 and pivot sleeve 88. Passing the hydraulic fluid through pivot post 94 also allows hydraulic lines from the aircraft (not shown) to be stationary relative to the RAT assembly 10. Because the hydraulic lines are stationary, the hydraulic lines are not required to flex much as RAT assembly 10 moves from the stowed position to the deployed position. Reducing the amount of flexing experienced by the hydraulic lines increases the service life of the hydraulic lines.

In view of the foregoing description, it will be recognized that the present disclosure provides numerous advantages and benefits. For example, the present disclosure provides frame 20 for RAT assembly 10. Frame 20 includes first lug 36 counteracting axial and lateral resonant modes experienced by frame 20. Frame 20 also includes second lug 42 for counteracting axial and vertical resonant modes that frame 20 may experience during operation. First rod 60 and second rod 62 are also connected to frame 20 to assist frame 20 with torsional resonant modes. Together, first lug 36, second lug 42, first rod 60, and second rod 62 provide a statically determinate mounting scheme for connecting frame 20 to an aircraft that reduces the likelihood of force loads being transferred from the aircraft to RAT mounting system 18. Frame 20 is also relatively light weight.

The following are non-exclusive descriptions of possible embodiments of the present invention.

In one embodiment, a ram air turbine (RAT) mounting system includes a frame having a forward end with a top side, a bottom side disposed opposite the top side, an inboard side, and an outboard side disposed opposite the inboard side. The frame further includes an aft end. A first lug is connected to the forward end of the frame proximate the top side and the inboard side. A second lug is connected to the forward end of the frame proximate the top side and the outboard side. A first rod is connected to the forward end of the frame proximate the bottom side and the inboard side. A second rod is connected to the aft end of the frame.

The RAT mounting system of the preceding paragraph can optionally include, additionally and/or alternatively, any one or more of the following features, configurations and/or additional components:

the first lug is extends generally in a lateral direction and comprises a hole extending generally in a vertical direction through the first lug, wherein the lateral direction is defined as a direction generally perpendicular with the vertical direction and a central axis of the frame.

the second lug extends generally in the vertical direction and comprises a hole extending generally in the lateral direction through the second lug;

the first rod extends from the inboard side generally in an inboard direction, wherein the inboard direction is defined as a direction that faces toward an aircraft when the RAT mounting system is mounted to the aircraft.

the second rod extends from the aft end of the frame generally in the inboard direction and generally parallel with the first rod;

the forward end of the frame further comprises: a pivot post extending along the bottom side of the forward end and between the inboard side and the outboard side; and/or the first rod is connected to the forward end of the frame proximate the pivot post.

In another embodiment, a ram air turbine (RAT) mounting system includes a frame with a forward end having a first side, a second side disposed opposite the first side, a third side, and a fourth side disposed opposite the third side. The frame also includes an aft end. A first mounting element is connected to the forward end of the frame proximate the first side and the third side. A second mounting element is connected to the forward end of the frame proximate the first side and the fourth side. A first rod is connected to the forward end of the frame proximate the second side and the third side. A second rod is connected to the aft end of the frame.

The RAT mounting system of the preceding paragraph can optionally include, additionally and/or alternatively, any one or more of the following features, configurations and/or additional components:

the second rod comprises an adjustable length;

the first rod extends from the third side of the forward end of the frame at approximately 30 degrees to approximately 45 degrees from a horizontal plane;

the second rod extends from the aft end of the frame at approximately 20 degrees to approximately 80 degrees from a horizontal plane;

the forward end of the frame further comprises: a pivot post extending along the second side of the forward end and between the third side and the fourth side;

a vertical distance between the first mounting element and a connection point of the first rod to the forward end of the frame is greater than a horizontal distance between the first mounting element and the second mounting element;

the first mounting element is a lug that extends generally parallel to the first side and perpendicular to the third side comprises a hole extending generally in a vertical direction through the first mounting element; and/or the second mounting element extends generally in a vertical direction and comprises a hole extending through the second mounting element perpendicular to the vertical direction.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air turbine (RAT) mounting system comprising:
    a frame comprising:
        a forward end comprising:
            a top side;
            a bottom side disposed opposite the top side;
            an inboard side; and
            an outboard side disposed opposite the inboard side; and
        an aft end;
    a first lug connected to the forward end of the frame proximate the top side and the inboard side, wherein the first lug is flat and extends generally in a lateral direction and comprises a hole extending generally in a vertical direction through the first lug, wherein the lateral direction is defined as a direction generally perpendicular with the vertical direction and a central axis of the frame;
    a second lug connected to the forward end of the frame proximate the top side and the outboard side;
    a first rod connected to the forward end of the frame proximate the bottom side and the inboard side; and
    a second rod connected to the aft end of the frame.

2. The RAT mounting system of claim 1, wherein the second lug extends generally in the vertical direction and comprises a hole extending generally in the lateral direction through the second lug.

3. The RAT mounting system of claim 1, wherein the first rod extends from the inboard side generally in an inboard direction, wherein the inboard direction is defined as a direction that faces toward an aircraft when the RAT mounting system is mounted to the aircraft.

4. The RAT mounting system of claim 3, wherein the second rod extends from the aft end of the frame generally in the inboard direction and generally parallel with the first rod.

5. The RAT mounting system of claim 1, wherein the forward end of the frame further comprises:
   a pivot post extending along the bottom side of the forward end and between the inboard side and the outboard side.

6. The RAT mounting system of claim 5, wherein the first rod is connected to the forward end of the frame proximate the pivot post.

7. A ram air turbine (RAT) mounting system comprising:
   a frame comprising:
      a forward end comprising:
         a first side;
         a second side disposed opposite the first side;
         a third side; and
         a fourth side disposed opposite the third side; and
      an aft end;
   a first mounting element connected to the forward end of the frame proximate the first side and the third side;
   a second mounting element connected to the forward end of the frame proximate the first side and the fourth side;
   a first rod connected to the forward end of the frame proximate the second side and the third side; and
   a second rod connected to the aft end of the frame, wherein the second rod extends from the aft end of the frame at approximately 20 degrees to approximately 80 degrees from a horizontal plane.

8. The RAT mounting system of claim 7, wherein the first rod extends from the third side of the forward end of the frame at approximately 30 degrees to approximately 45 degrees from a horizontal plane.

9. The RAT mounting system of claim 7, wherein the forward end of the frame further comprises:
   a pivot post extending along the second side of the forward end and between the third side and the fourth side.

10. The RAT mounting system of claim 7, wherein a vertical distance between the first mounting element and a connection point of the first rod to the forward end of the frame is greater than a horizontal distance between the first mounting element and the second mounting element.

11. The RAT mounting system of claim 7, wherein the first mounting element is a lug that extends generally parallel to the first side and perpendicular to the third side comprises a hole extending generally in a vertical direction through the first mounting element.

12. The RAT mounting system of claim 7, wherein the second mounting element extends generally in a vertical direction and comprises a hole extending through the second mounting element perpendicular to the vertical direction.

* * * * *